(12) United States Patent
Lee et al.

(10) Patent No.: US 10,701,756 B2
(45) Date of Patent: Jun. 30, 2020

(54) SERVICE SPECIFIC SHORT DRX CYCLES

(71) Applicant: QUALCOMM Incorporated, San Diego, CA (US)

(72) Inventors: Kuo-Chun Lee, San Diego, CA (US); Srinivasan Balasubramanian, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 15/596,796

(22) Filed: May 16, 2017

(65) Prior Publication Data

US 2018/0338332 A1 Nov. 22, 2018

(51) Int. Cl.
*H04W 76/28* (2018.01)
*H04W 52/02* (2009.01)

(52) U.S. Cl.
CPC ....... *H04W 76/28* (2018.02); *H04W 52/0216* (2013.01); *H04W 52/0241* (2013.01)

(58) Field of Classification Search
None
See application file for complete search history.

(56) References Cited

U.S. PATENT DOCUMENTS

| 2008/0090573 | A1* | 4/2008 | Kim | H04W 36/08 455/436 |
| 2008/0267105 | A1* | 10/2008 | Wang | H04W 52/0225 370/311 |
| 2009/0238098 | A1* | 9/2009 | Cai | H04W 76/28 370/254 |
| 2010/0135231 | A1* | 6/2010 | Harada | H04W 52/0225 370/329 |

(Continued)

FOREIGN PATENT DOCUMENTS

WO 2013066053 A1 5/2013

OTHER PUBLICATIONS

3GPP TS 24.301: "3rd Generation Partnership Project; Technical Specification Group Core Network and Terminals; Non-Access-Stratum (NAS) Protocol for Evolved Packet System (EPS); Stage 3 (Release 14)", 3GPP Standard; Technical Specification; 3rd Generation Partnership Project (3GPP), vol. CT WG1, No. V14.3.0, Mar. 17, 2017 (Mar. 17, 2017), pp. 1-476, XP051290608, [retrieved on Mar. 17, 2017].

(Continued)

*Primary Examiner* — Xavier S Wong
(74) *Attorney, Agent, or Firm* — Norton Rose Fulbright LLP

(57) ABSTRACT

Certain aspects of the present disclosure relate to methods and apparatus for transitioning between short DRX and long DRX cycles based on service type to improve performance (e.g., reduce delay) while limiting power consumption. In (Continued)

one example, the UE switches to a long DRX cycle after a DRX Short Cycle Timer, or drxShortCycleTimer, expires. The UE may also switch to a long DRX if the UE receives long DRX MAC control element (CE) from a gNB. In another example, a gNB may configure a radio bearer from a set of radio bearers (data radio bearer (DRB) and/or signal radio bearer (SRB)), denoted by S, to trigger the UE to enter a short DRX cycle.

20 Claims, 15 Drawing Sheets

(56) References Cited

U.S. PATENT DOCUMENTS

| | | | | |
|---|---|---|---|---|
| 2011/0116427 A1* | 5/2011 | Chang | ............... | H04W 52/0216 |
| | | | | 370/311 |
| 2012/0275366 A1* | 11/2012 | Anderson | ......... | H04W 52/0219 |
| | | | | 370/311 |
| 2013/0088983 A1* | 4/2013 | Pragada | ............... | H04W 16/14 |
| | | | | 370/252 |
| 2013/0294307 A1 | 11/2013 | Johansson et al. | | |
| 2013/0308507 A1* | 11/2013 | Wanstedt | .......... | H04W 52/0216 |
| | | | | 370/311 |
| 2014/0233391 A1* | 8/2014 | Reider | ............. | H04W 52/0212 |
| | | | | 370/236 |
| 2015/0181526 A1* | 6/2015 | Lee | ................... | H04W 52/0241 |
| | | | | 370/311 |
| 2015/0305056 A1* | 10/2015 | Vangala | ............ | H04W 72/1242 |
| | | | | 455/450 |
| 2015/0319744 A1* | 11/2015 | Jung | ..................... | H04W 24/10 |
| | | | | 370/328 |
| 2015/0358967 A1* | 12/2015 | Xie | ................... | H04W 72/0453 |
| | | | | 370/329 |
| 2016/0212709 A1* | 7/2016 | Park | .................. | H04W 52/0251 |

OTHER PUBLICATIONS

International Search Report and Written Opinion—PCT/US2018/032249—ISA/EPO—dated Jul. 30, 2018.

* cited by examiner

SERVICE SPECIFIC SHORT DRX CYCLES

INTRODUCTION

The following relates generally to wireless communication, and more specifically to receiving on transmit and transmitting on receive.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations (BS), each simultaneously supporting communication for multiple communication devices, which may otherwise be known as user equipment (UE).

In some cases, a UE may establish a discontinuous reception (DRX) mode where it may periodically power up a radio to receive. The UE may power down a radio between DRX on durations to conserve power. Using a discontinuous reception (DRX) cycle enables the efficient use of battery power. However, powering down until a subsequent transmission opportunity may result in significant latency. Time sensitive response packets may be lost entirely.

SUMMARY

A method of wireless communication is described. The method includes sending data associated with a service, determining whether to transition between short and long DRX cycles based at least in part on a service type, and signaling a user equipment (UE) to transition between the short and long DRX cycles based at least in part on the determination.

An apparatus for wireless communication is described. The apparatus includes means for sending data associated with a service, means for determining whether to transition between short and long DRX cycles based at least in part on a service type, and means for signaling a user equipment (UE) to transition between the short and long DRX cycles based at least in part on the determination.

A further apparatus is described. The apparatus may include a processor, memory in electronic communication with the processor, and instructions stored in the memory. The instructions may be operable to cause the processor to send data associated with a service, determine whether to transition between short and long DRX cycles based at least in part on a service type, and signal a user equipment (UE) to transition between the short and long DRX cycles based at least in part on the determination.

A non-transitory computer readable medium for wireless communication is described. The non-transitory computer-readable medium may include instructions to cause a processor to send data associated with a service, determine whether to transition between short and long DRX cycles based at least in part on a service type, and signal a user equipment (UE) to transition between the short and long DRX cycles based at least in part on the determination.

A method of wireless communication is described. The method may include receiving data associated with a service, determining whether to transition between short and long DRX cycles based at least in part on a service type, and receiving a signal to transition between the short and long DRX cycles based at least in part on the determination.

An apparatus for wireless communication is described. The apparatus may include means for receiving data associated with a service, means for determining whether to transition between short and long DRX cycles based at least in part on a service type, and means for receiving a signal to transition between the short and long DRX cycles based at least in part on the determination.

A further apparatus is described. The apparatus may include a processor, memory in electronic communication with the processor, and instructions stored in the memory. The instructions may be operable to cause the processor to receive data associated with a service, determine whether to transition between short and long DRX cycles based at least in part on a service type, and receive a signal to transition between the short and long DRX cycles based at least in part on the determination.

A non-transitory computer readable medium for wireless communication is described. The non-transitory computer-readable medium may include instructions to cause a processor to receive data associated with a service, determine whether to transition between short and long DRX cycles based at least in part on a service type, and receive a signal to transition between the short and long DRX cycles based at least in part on the determination.

DETAILED DESCRIPTION

A wireless device may switch between using a short discontinuous reception (DRX) cycle and a long DRX cycle to enable the efficient use of battery power and reduce latency for latency sensitive data. The time delay between when data is generated and when it is correctly received is referred to as latency. With a DRX cycle configured, a terminal monitors the downlink control and data signaling in less than all the subframes per DRX cycle, sleeping with the receiver circuitry switched off in the remaining subframes. With a DTX cycle configured, the terminal monitors the uplink control and data signaling in less than all the subframes per DTX cycle, sleeping with the receiver circuitry switched off in the remaining subframes. After a radio resource control (RRC) connection has been established between a BS and a UE, a UE may enter a sleep state when not actively communicating. The DRX or DTX cycle may determine how frequently the UE wakes up to receive DL data or transmit UL data. The UL and DL data may include control signaling, user data, or both. Another type of signaling used in addition to RRC includes Layer 2 signaling. The following proposed method and apparatus to switch between short DRX and long DRX may be used to improve latency and reduce power consumption. These configurations may be based on an application and service in addition to being UE specific.

The choice of a long DRX cycle or a short DRX cycle may depend on the type of service (e.g., whether the traffic is latency sensitive, the priority of the data, or the acknowledgement mode). Some examples of delay sensitive traffic include Voice Over IP, live video and online gaming. An example of non-sensitive data involves Internet browsing.

Aspects of the disclosure are initially described in the context of a wireless communication system. Aspects of the disclosure are then illustrated by and described with reference to apparatus diagrams, system diagrams, and flowcharts that relate to receiving on transmit and transmitting on receive.

Figure 1:
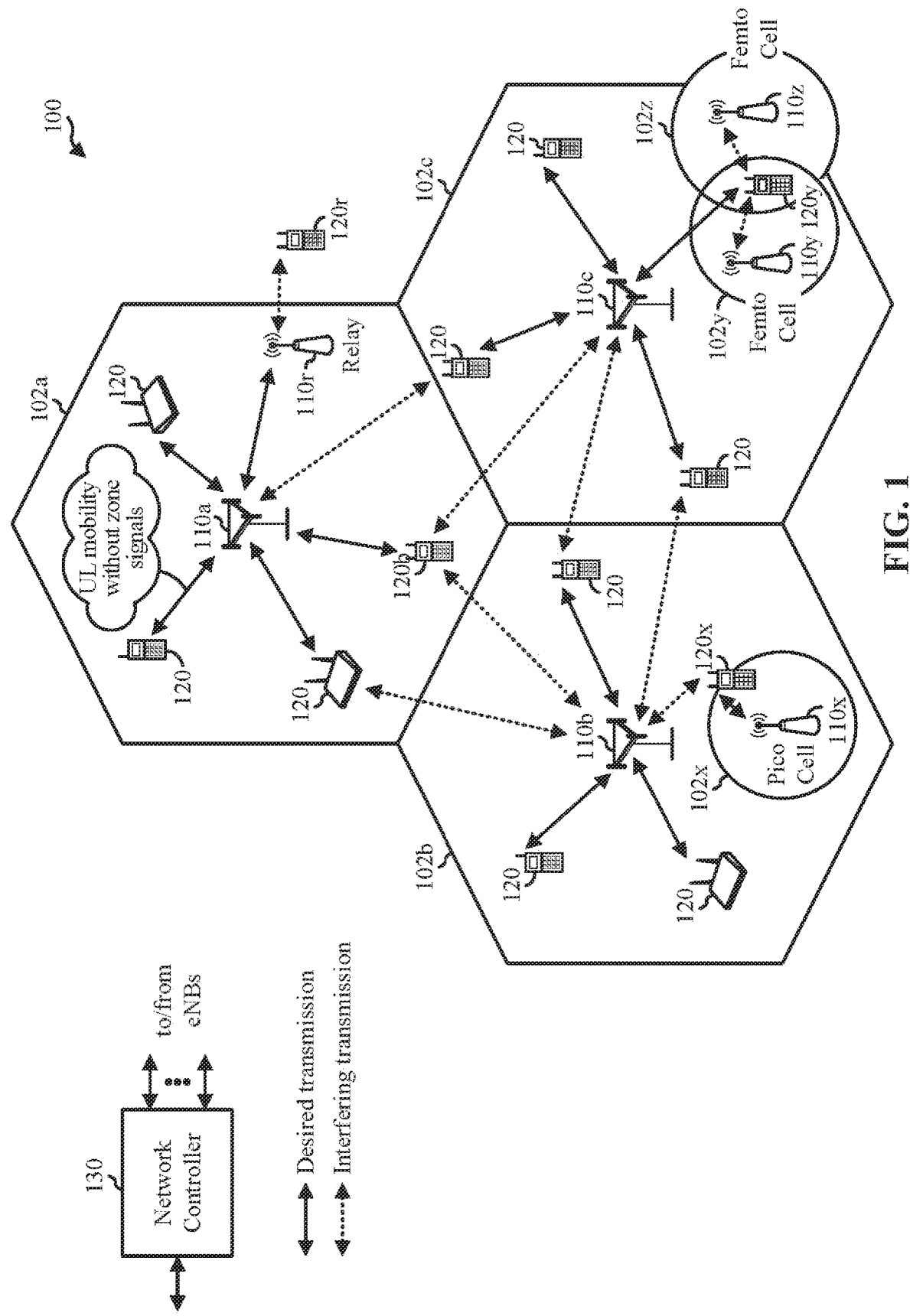
FIG. 1 is a block diagram conceptually illustrating an example telecommunications system, in accordance with certain aspects of the present disclosure.

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS 110 may be a station that communicates with UEs 120. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station 120. In some examples, the base stations 110 may be interconnected to one another and/or to one or more other base stations 110 or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

ABS 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs in a Closed Subscriber Group (CSG), UEs for users in the home, etc.). ABS 110 for a macro cell may be referred to as a macro BS 110. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE 120 may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP), or gNB) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
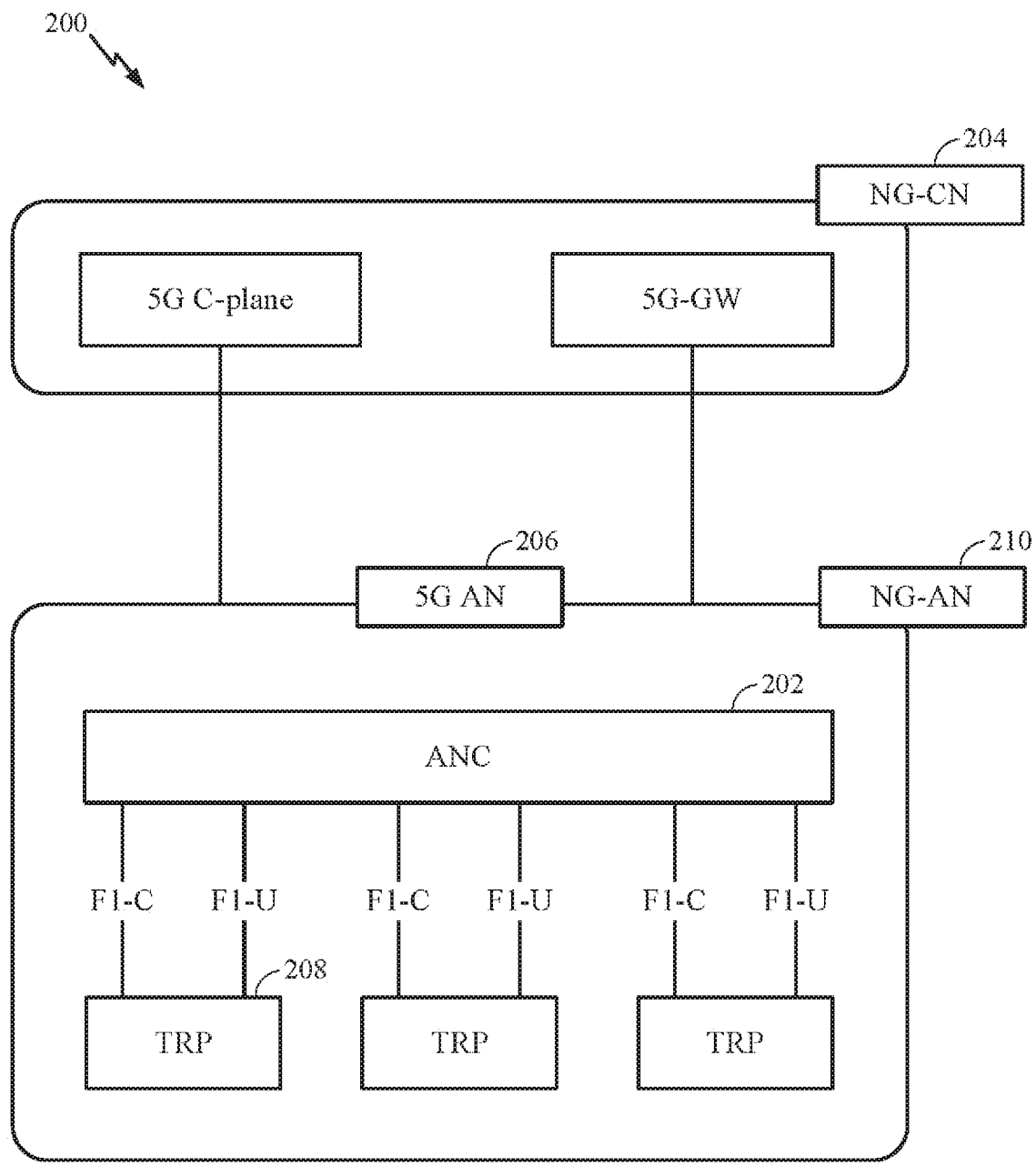
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNB, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
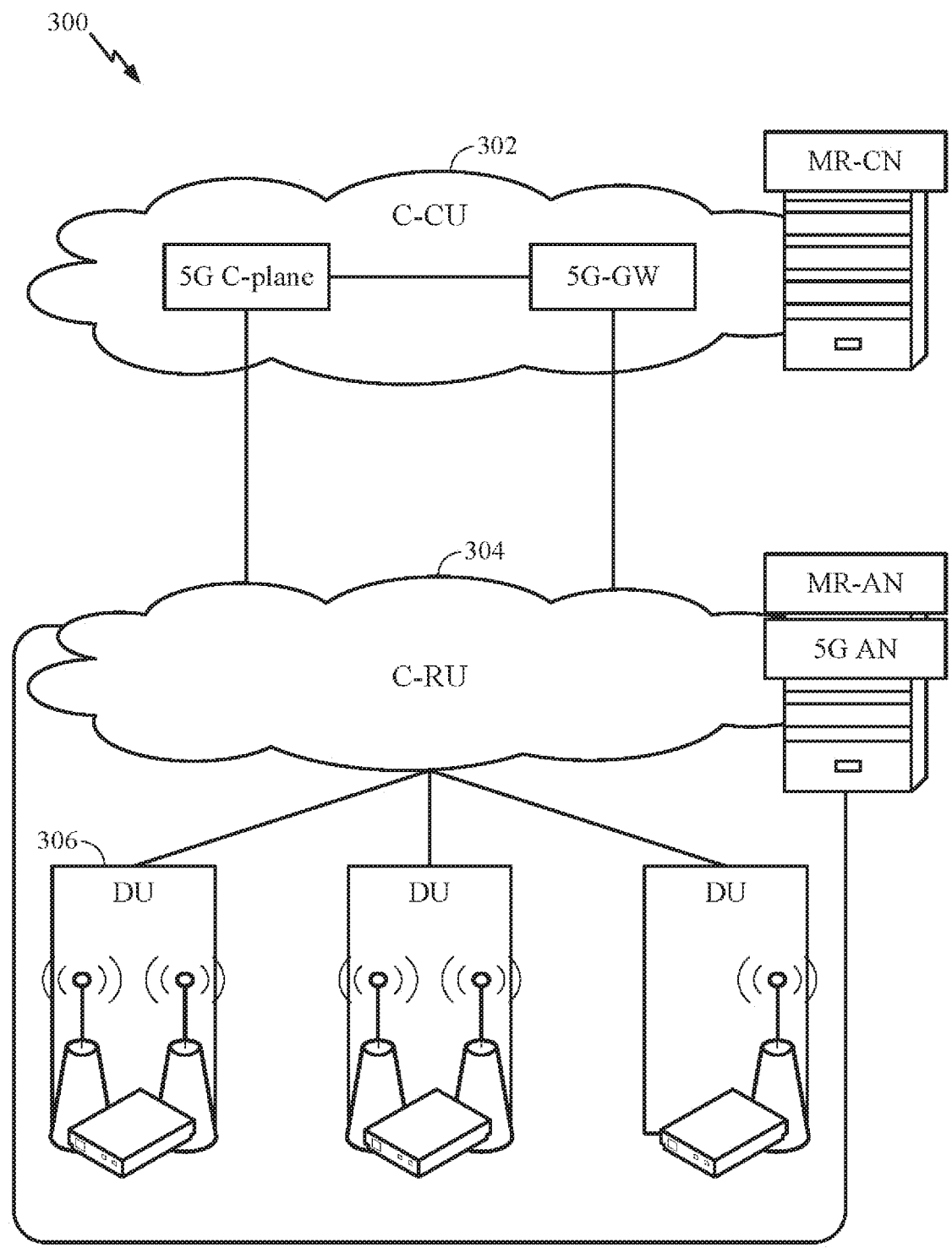
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
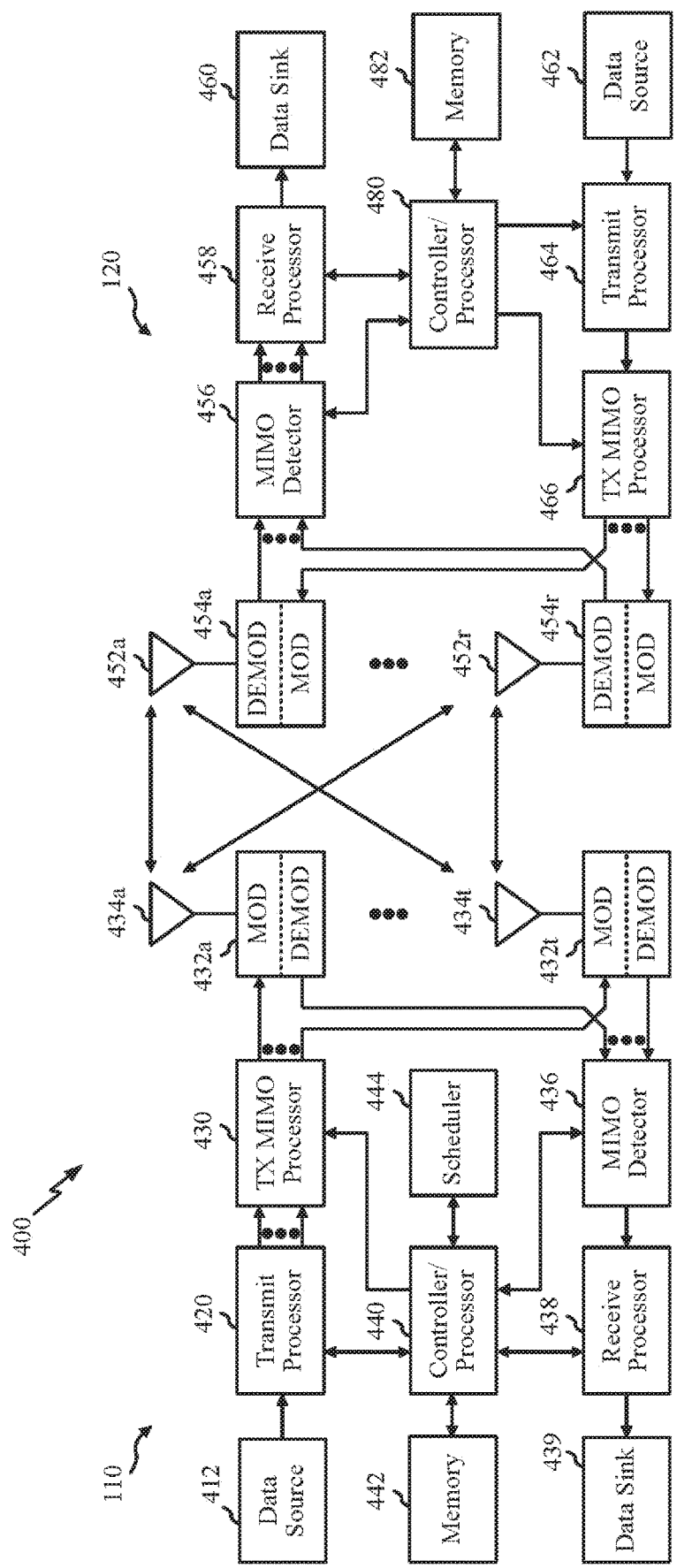
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 6-13.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a base station of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the BS 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5A:
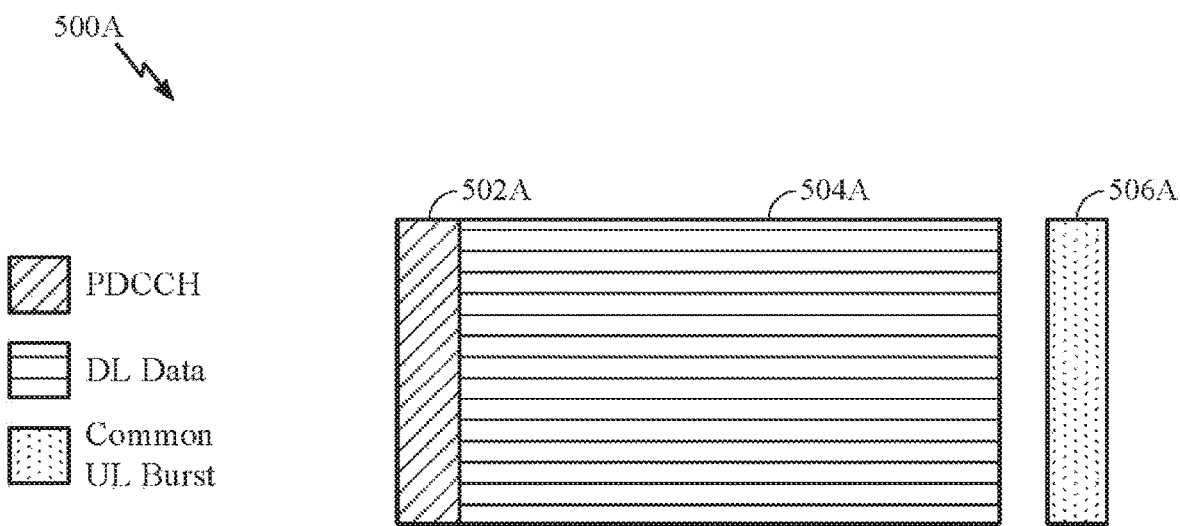
FIG. 5A is a diagram illustrating an example of a downlink (DL)-centric subframe according to some aspects of the present disclosure.

FIG. 5A is a diagram 500A showing an example of a DL-centric subframe. The DL-centric subframe may include a control portion 502A. The control portion 502A may exist in the initial or beginning portion of the DL-centric subframe. The control portion 502A may include various scheduling information and/or control information corresponding to various portions of the DL-centric subframe. In some configurations, the control portion 502A may be a physical DL control channel (PDCCH), as indicated in FIG. 5A. The DL-centric subframe may also include a DL data portion 504A. The DL data portion 504A may sometimes be referred to as the payload of the DL-centric subframe. The DL data portion 504A may include the communication resources utilized to communicate DL data from the scheduling entity 202 (e.g., eNB, BS, Node B, 5G NB, TRP, etc.) to the subordinate entity, e.g., UE 120. In some configurations, the DL data portion 504A may be a physical DL shared channel (PDSCH). The DL-centric subframe may also include a common UL portion 506A. The common UL portion 506A may sometimes be referred to as an UL burst, a common UL burst, and/or various other suitable terms. The common UL portion 506A may include feedback information corresponding to various other portions of the DL-centric subframe. For example, the common UL portion 506 may include feedback information corresponding to the control portion 502A. Non-limiting examples of feedback information may include an ACK signal, a NACK signal, a HARQ indicator, and/or various other suitable types of information. The common UL portion 506A may include additional or alternative information, such as information pertaining to random access channel (RACH) procedures, scheduling requests (SRs), sounding reference signals (SRS) and various other suitable types of information. As illustrated in FIG. 5A, the end of the DL data portion 504A may be separated in time from the beginning of the common UL portion 506A. This time separation may sometimes be referred to as a gap, a guard period, a guard interval, and/or various other suitable terms. This separation provides time for the switchover from DL communication (e.g., reception operation by the subordinate entity, e.g., UE 120) to UL communication (e.g., transmission by the subordinate entitye.g., UE 120). One of ordinary skill in the art will understand, however, that the foregoing is merely one example of a DL-centric subframe and alternative structures having similar features may exist without necessarily deviating from the aspects described herein.

Figure 5B:
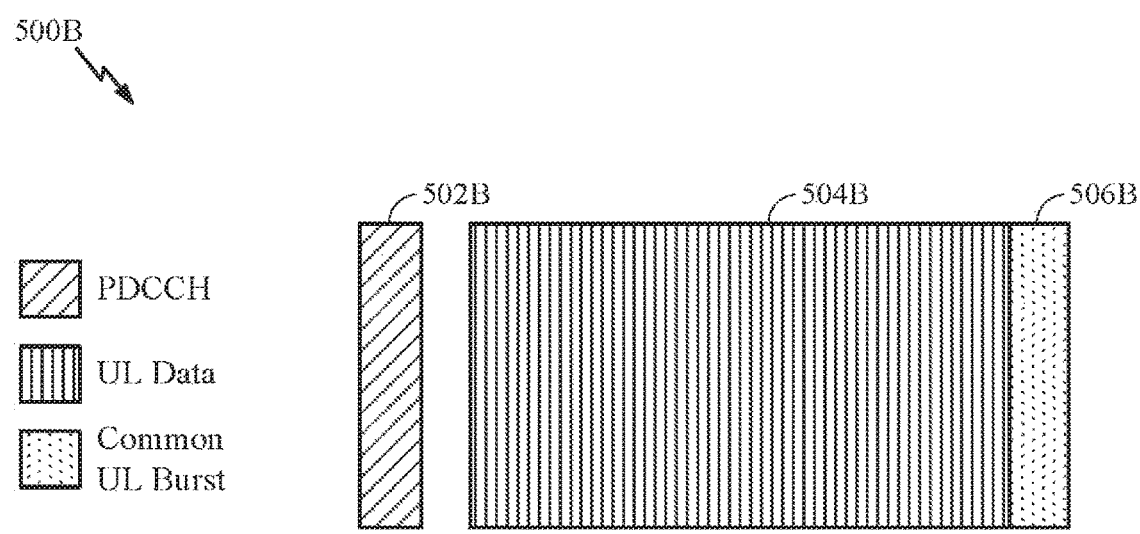
FIG. 5B is a diagram illustrating an example of an uplink (UL)-centric subframe according to some aspects of the present disclosure.

FIG. 5B is a diagram 500B showing an example of an UL-centric subframe. The UL-centric subframe may include a control portion 502B. The control portion 502B may exist in the initial or beginning portion of the UL-centric subframe. The control portion 502B in FIG. 5B may be similar to the control portion 502A described above with reference to FIG. 5A. The UL-centric subframe may also include an UL data portion 504B. The UL data portion 504B may sometimes be referred to as the payload of the UL-centric subframe. The UL portion may refer to the communication resources utilized to communicate UL data from the subordinate entitye.g., UE 120 to the scheduling entity 202 (e.g., eNB). In some configurations, the control portion 502B may be a physical UL shared channel (PUSCH). As illustrated in FIG. 5B, the end of the control portion 502B may be separated in time from the beginning of the UL data portion 504B. This time separation may sometimes be referred to as a gap, guard period, guard interval, and/or various other suitable terms. This separation provides time for the switchover from DL communication (e.g., reception operation by the scheduling entity 202) to UL communication (e.g., transmission by the scheduling entity 202). The UL-centric subframe may also include a common UL portion 506B. The common UL portion 506B in FIG. 5B may be similar to the common UL portion 506A described above with reference to FIG. 5A. The common UL portion 506B may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein. In summary, a UL centric subframe may be used for transmitting UL data from one or more mobile stations to a base station, and a DL centric subframe may be used for transmitting DL data from the base station to the one or more mobile stations. In one example, a frame may include both UL centric subframes and DL centric subframes. In this example, the ratio of UL centric subframes to DL subframes in a frame may be dynamically adjusted based on the amount of UL data and the amount of DL data that needs to be transmitted. For example, if there is more UL data, then the ratio of UL centric subframes to DL subframes may be increased. Conversely, if there is more DL data, then the ratio of UL centric subframes to DL subframes may be decreased.

Figure 6:
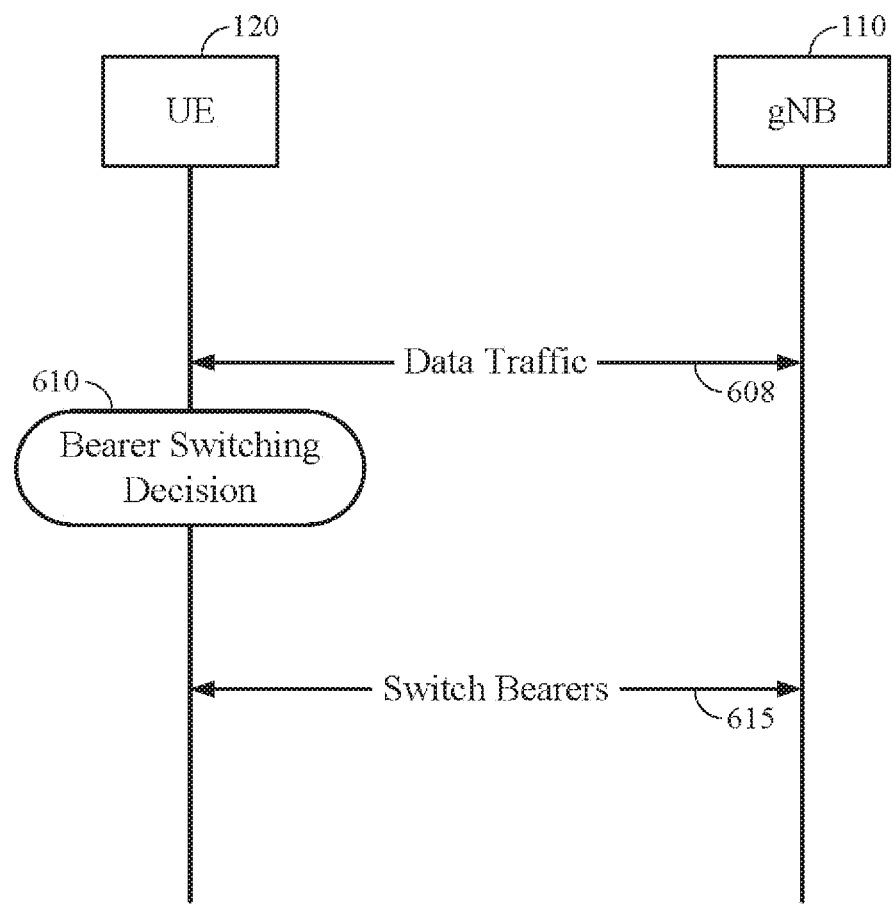
FIG. 6 illustrates a call flow of an exemplary process a BS may follow in switching data bearers.

In some cases, a UE 120 may monitor a communication link continuously for an indication the UE 120 may receive data. In other cases a UE 120 may be configured with a DRX or DTX cycle (e.g. to extend battery life and conserve power.) A DRX cycle consists of an active duration (e.g an "on duration") when the UE 120 may monitor for control information (e.g. on physical downlink control channel (PDCCH)) and an inactive duration (e.g. a "DRX period") when the UE 120 may power down radio components. In other words, a DRX cycle allows a UE to periodically sleep while in connected mode. A DTX cycle consists of an active duration (e.g. an "on duration") when the UE 120 may transmit a scheduling request and an inactive duration (e.g. a "DTX period) when the UE 120 may power down radio components. According to the 3GPP TS 36.321 specification, a UE 120 may be configured with a short DRX or DTX cycle and a long DRX or DTX cycle. The short DRX cycle may be used to improve performance (i.e., reduce delay) for delay sensitive traffic. However, a UE 120 may consume more power with short DRX cycles because the UE wakes up more frequently. In the current 3GPP TS 36.321 specification neither long nor short cycles depend on the kind or type of traffic and, are instead, UE specific. For example, a UE that does not have delay sensitive traffic may still use short and long DRX cycles. The transition to a long DRX cycle following a short DRX cycle may depend on the service type and priority of the data being communicated. In some cases, the best possible link for each data bearer is selected based on the performance of the link. The performance of each of the available links may be evaluated on a real-time basis by looking at one or more parameters. Some of the parameters considered for the decision include signal and channel quality, available bandwidth, latency, as well as the operator policies regarding which applications and services are allowed to be moved from long DRX to short DRX and from short DRX to long DRX. The UE may make the decision to switch bearers between long DRX and short DRX cycles based on the type of traffic it is carrying. FIG. 6 illustrates a call flow of an exemplary process a UE 120 may follow when switching data bearers. At 608, the UE 120 may obtain data traffic from, or send traffic to the gNB 110. At 610, the UE 120 determines whether to switch bearers, basing the decision on the service type of the data traffic such as whether the traffic is delay sensitive. At 615, the UE 120 may switch bearers based on the data service type.

In wireless communications system 100, UE 120 may use a DRX cycle to enable the efficient use of battery power. After a radio resource control (RRC) connection has been established between a gNB (which may also be referred to as BSs, NR BSs, Node Bs, 5G NBs, APs, or some other term) 110 and a UE 120, the UE 120 may enter a sleep state when not actively communicating. The DRX cycle may determine how frequently UE 120 wakes up to check for incoming transmissions, such as paging messages, scheduling information, and data. For example, based on a DRX configuration, UE 120 may wake up during periodic subframes to monitor control channels (e.g., a primary downlink control channel (PDCCH)) for scheduled data.

Figure 7:
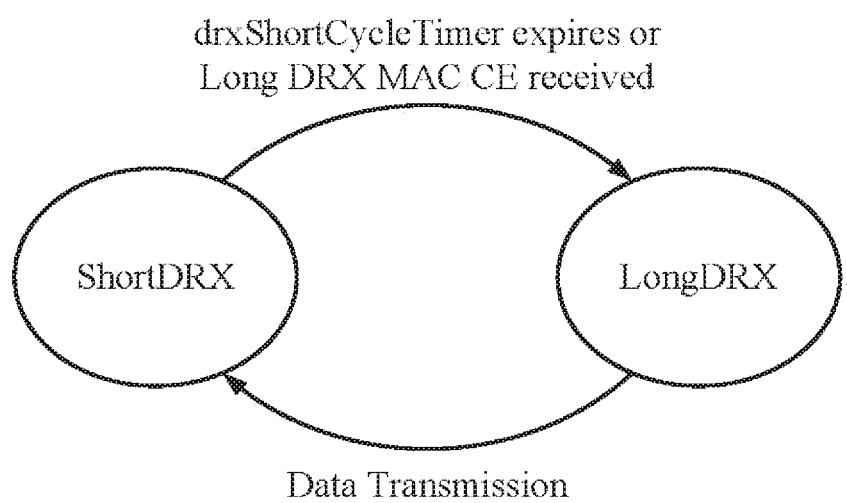
FIG. 7 is a diagram illustrating switching between short DRX cycle and long DRX cycle and vica versa.

FIG. 7 is a diagram illustrating switching between short DRX cycle and long DRX cycle and vica versa. In some cases, following the beginning of transmission of delay sensitive data during a short DRX cycle, UE 120 may begin a short cycle timer. The short cycle timer may correspond to the time UE 120 waits after transmitting or receiving delay sensitive data during a short DRX cycle. In the event that no more delay sensitive data is transmitted for N short cycles (e.g. configured by a timer known as a drxShortCycleTimer), the UE may switch to a long DRX cycle after the DRX short cycle timer, drxShortCycleTimer, expires. The UE may also switch to a long DRX if the UE receives a long DRX MAC control element (CE) from the gNB 110. Conversely, if there is time sensitive data, then the UE 120 may switch to short DRX. In one example, the timer may be located on the UE 120 and in another example, the timer may be located with the gNB 110. If the timer is located on the gNB, the gNB 110 will send the UE 120 a signal when the timer has expired. In some cases, the short cycle timer may be started after the UE 120 is turned on. This is illustrated for example, in FIG. 8. As long as delay sensitive traffic is transmitted or received, the UE will use short cycle DRX. The service type, in this case, delay sensitive traffic, acts as an implicit trigger to switch to or keep the DRX cycle as short.

The total duration that UE 120 is awake may be referred to as the DRX active duration. The active duration includes the DRX on duration of the DRX cycle.

In some cases, DRX or DTX may be configured based on a radio bearer basis. A bearer establishes a "virtual" connection between two endpoints so that traffic can be sent between them. It acts as a pipeline between the two endpoints which in this case is the UE 120 and the gNB 110. The virtual connection provides a "bearer service", or put another way, a transport service with specific QoS attributes. An EPS virtual connection or "EPS bearer" is characterized by: i) two endpoints; and ii) a QoS Class Index (QCI) that describes the type of service that makes use of the virtual connection (e.g. signaling, best effort, conversational voice, streaming video, delay sensitive, etc). That is, a single DRX or DTX configuration may be applied to a given UE 120 at any time.

Figure 8:
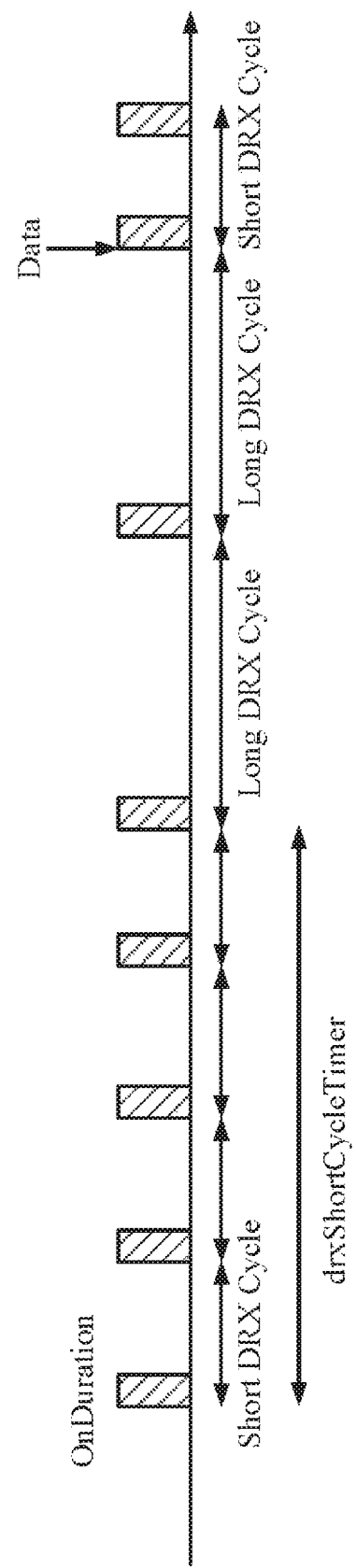
FIG. 8 is a timeline which shows the transmission of radio bearers which allows the switching between short and long DRX in accordance with aspects of the present disclosure.
Figure 9:
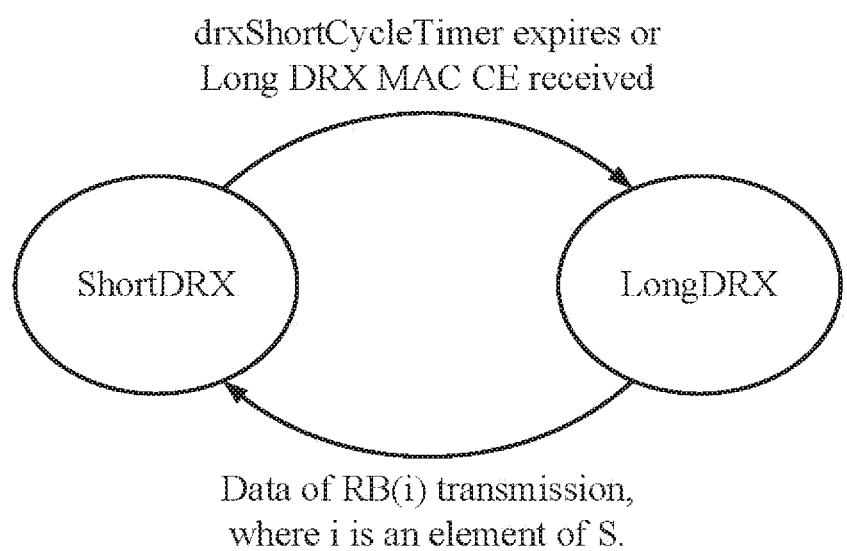
FIG. 9 is a diagram illustrating switching between short DRX cycle and long DRX cycle and vica versa using data bearers which are elements of set S.

In some DRX configurations, UE 120 may monitor for control messages that are sent by the gNB (which may also be referred to as BSs, NR BSs, Node Bs, 5G NBs, APs, or some other term) 110 which may signal a UE 120 to use a radio bearer which triggers a specific transition between short DRX and long DRX cycles such as the Long DRX MAC CE. In one example, a configuration may comprise one or more bearers set up between the UE 120 and the gNB 110. The bearers may then be used to support short or long DRX cycles depending on the traffic service type, how many QoS the bearer(s) support, and what the QoS is. Data radio bearers handle IP packets. User plane data is carried on the air interface by the DRB. Signal radio bearers (SRBs) are used to transfer signaling messages like RRC and NAS. In one example, the UE 120 can start from a short DRX cycles and if there is no delay sensitive traffic, the gNB 110 may send a long DRX MAC Control Element (CE) to switch the UE 120 to enter a long DRX cycle. See FIG. 9. In one example, the gNB 110 may configure a set of radio bearers (data radio bearer (DRB) and/or signal radio bearer (SRB), denoted by S, which can support short DRX cycles. When traffic is delay sensitive, a bearer from this set is selected to support short DRX cycle. This is illustrated for example, in FIG. 9. The UE 120 may stay in short DRX until the expiration of the short cycle timer or until a MAC control message sent by the gNB 110 tells UE 120 to switch to long DRX cycle. In one example, the timer expires when the number of short cycles N=4 as shown in FIG. 8. However, N may take on other values. In one example, i is determined by the BS. Switching to long DRX cycle increases latency, so the timer runs for a few cycles to avoid switching to long cycle DRX too quickly. Sending the Long DRX MAC CE can cause the cycle to switch back to long DRX more quickly than using the timer. If delay sensitive data comes in again, the UE switches back to short cycle DRX to reduce latency.

Alternatively, a gNB 110 may add one or more bits to each radio bearer to indicate whether that bearer supports delay sensitive data. In one example, the added bit(s) may be called a delay sensitive bit(s) where, when it is set to "1," this indicates the bearer carries delay sensitive data and where "0," indicates the bearer does not carry delay sensitive data.

The above examples are radio bearer specific. In some examples, transitions between short DRX and long DRX may be QoS flow specific (as discussed above, a DRB may have multiple QoS flows). For example, if a specific QoS flow(s) of delay sensitive traffic has data transmissions, then short DRX cycles may be used.

Figure 10:
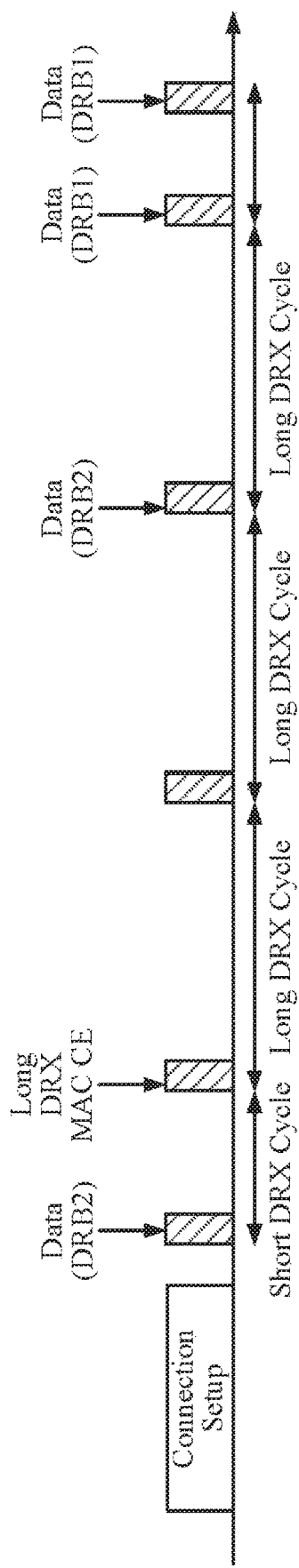
FIG. 10 is a timeline which shows the transmission of radio bearers which allows the switching between short and long DRX in accordance with aspects of the present disclosure.
Figure 10:
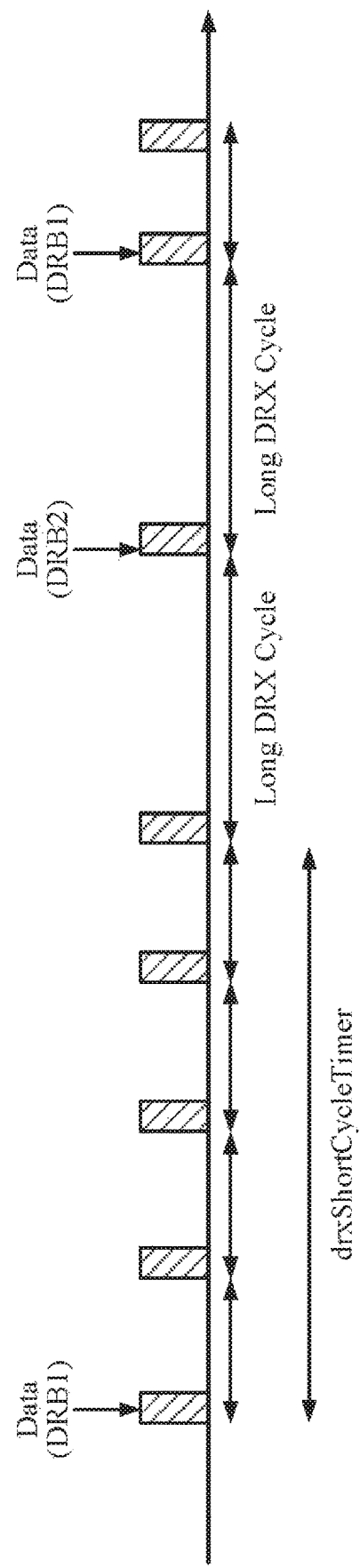

FIG. 10 illustrates one example where bearers are used to switch or transition between short DRX and long DRX. The UE 120 in this example has four radio bearers, signaling rate bearer 1 (SRB1), signaling rate bearer 2 (SRB2), data rate bearer 1 (DRB1) and data rate bearer 2 (DRB2). The bearers used to transition to a short DRX have one or more QoS Class Indexes (QCI) that provide(s) a service level which supports delay sensitive traffic. Here, only DRB1 provides a quality of service which supports delay sensitive traffic. In other examples, one or more bearers can support both short and long DRX cycles. In FIG. 10, initially a short DRX is used at connection setup. However, the data is not delay sensitive. So after one short cycle, a long MAC control element is sent to the UE 120 to switch it to a long DRX. The DRX cycle stays at long DRX until delay sensitive data is received. Then the data rate bearer is switched to data rate bearer 1 (DRB1), whose QoS supports delay sensitive traffic, and the DRX cycle transitions the DRX to a short DRX.

The UE 120 stays on long DRX cycles until delay sensitive data is received. The delay sensitive data triggers the UE to switch to a short DRX cycle which is supported by DRB1. FIG. 10 cont. illustrates one example where a timer is used to switch or transition the DRX back to long DRX from the short DRX cycle. Data rate bearer DRB1 provides a quality of service which supports delay sensitive traffic. The UE 120 moves into a short DRX cycle from the long DRX cycle and, after the third DBR1, starts a DRX short cycle timer, drxShortCycleTimer. When the DRX Short Cycle Timer expires, the UE 120 may resume a long DRX cycle which in FIG. 10 cont occurs after N short cycles, where here N=4. The UE 120 transitions back to short DRX cycle when it receives DRB1.

Figure 11:
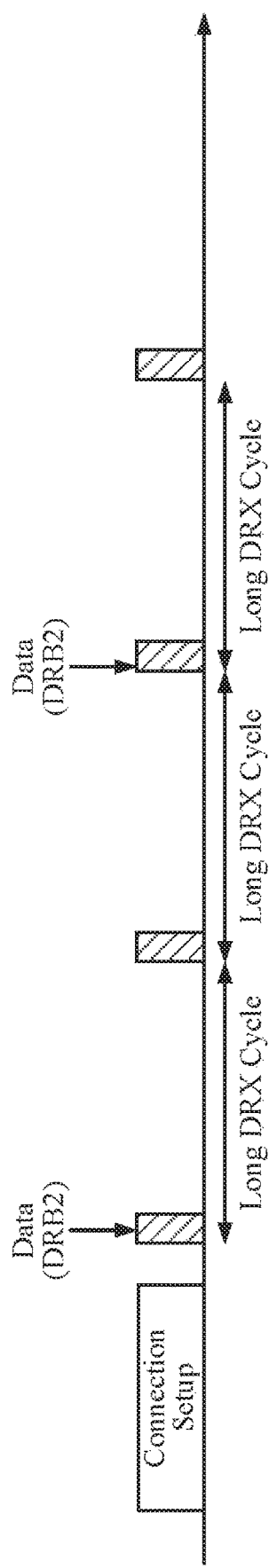
FIG. 11 is a timeline which shows the transmission of radio bearers which allows the switching between short and long DRX in accordance with aspects of the present disclosure.
Figure 11:
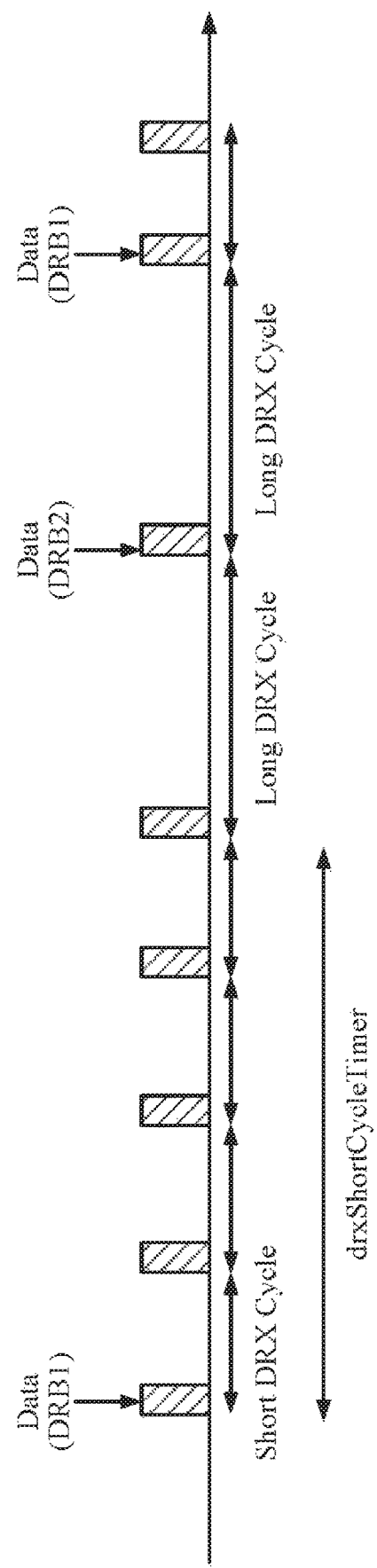

FIG. 11 illustrates one example where a specific bearer is used to switch or transition between long DRX and short DRX. Initially, a long DRX is used at connection setup to support non-sensitive delay traffic. Following four long DRX cycles, the data bearer is switched to one that supports delay sensitive traffic and the DRX cycle is switched to a short DRX cycle. The DRX stays as a short DRX cycle until a drxShortCycleTimer expires where the UE switches to a long DRX cycle (See FIG. 11 cont.). Using the timer avoids the sending of a long DRX MAC CE by the gNB 110 to switch the DRX to long.

Figure 12:
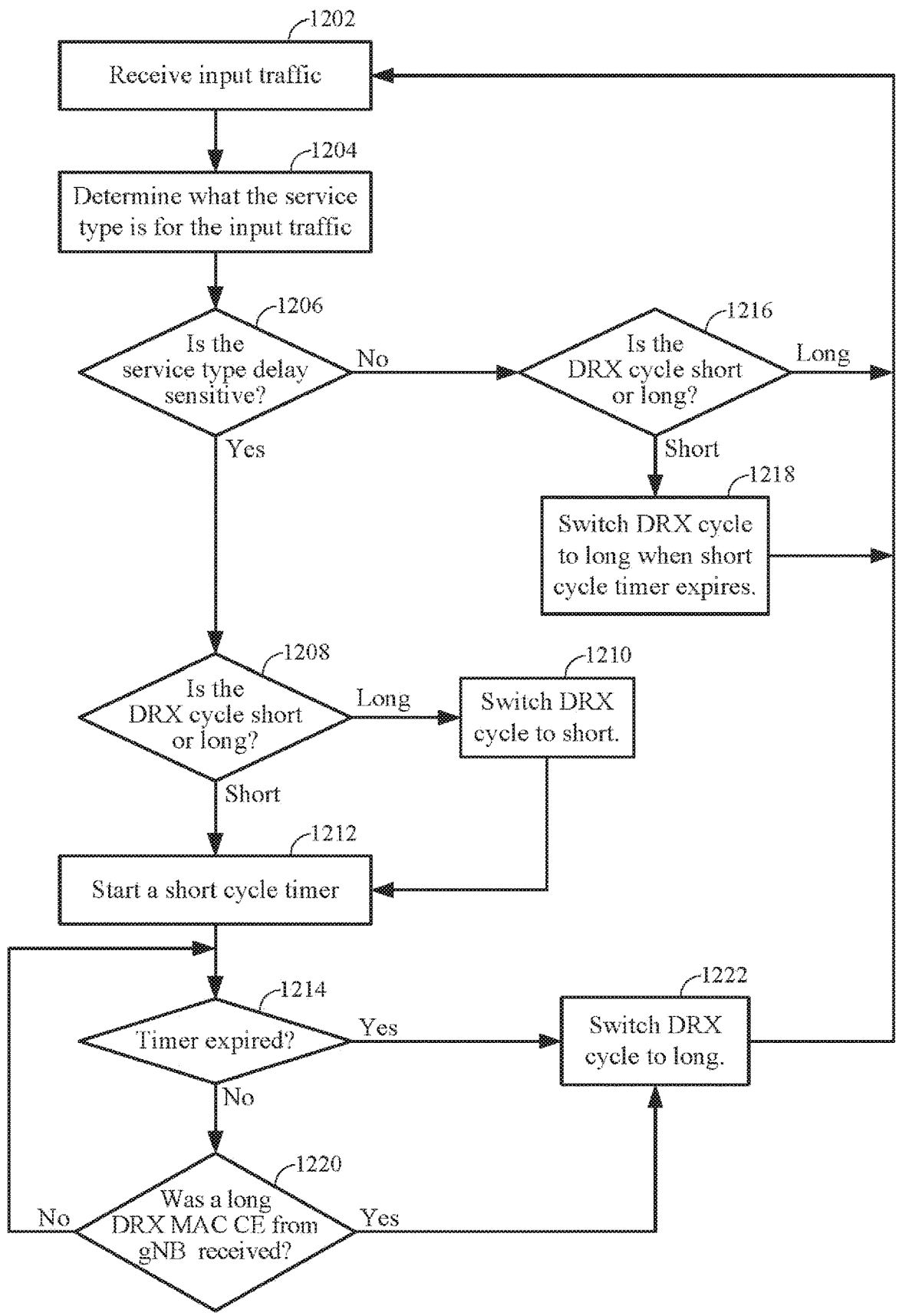
FIG. 12 is a flowchart showing the steps taken when bearers are used to switch or transition between short DRX and long DRX in accordance with aspects of the present disclosure.

FIG. 12 is a flowchart showing steps taken where a specific bearer is used to switch or transition between short DRX and long DRX. In step 1202, the UE 120 receives input traffic from a gNB 110. In step 1204, it is determined what service type the input traffic is. If the service type is delay sensitive, in step 1206, in step 1208, the gNB determines if the DRX is long or short. If the DRX is long, in step 1210, the DRX cycle is switched to a short DRX cycle. Then a short cycle timer is started in step 1212. If the DRX cycle is short in step 1208, in step 1212 the short cycle timer, "drxShortCycleTimer", is started. In one example, the "drxShortCycleTimer" may be started by the gNB 110. In another example the timer is started by the UE. In step 1214, the timer is checked to see if it has expired. If the timer has expired, the DRX cycle is switched to a long DRX cycle in step 1222 and process goes back to step 1202. If the timer has not expired, if the UE 120 did not receive a Long DRX MAC CE from the gNB 110 in step 1220, the process loops back to step 1214. In step 1220, if the UE 120 receives a Long DRX MAC CE from the gNB 110, the DRX cycle is switched to a long DRX cycle in step 1222 and the process goes back to step 1202. If in step 1206, the service type is not delay sensitive, in step 1216, it is determined if the DRX cycle is short or long. If it is short, in step 1218, the DRX cycle is switched to a long DRX cycle when the short cycle timer expires, then the process goes back to step 1202. If the DRX is long in step 1216, then the process goes back to step 1202.

Figure 13:
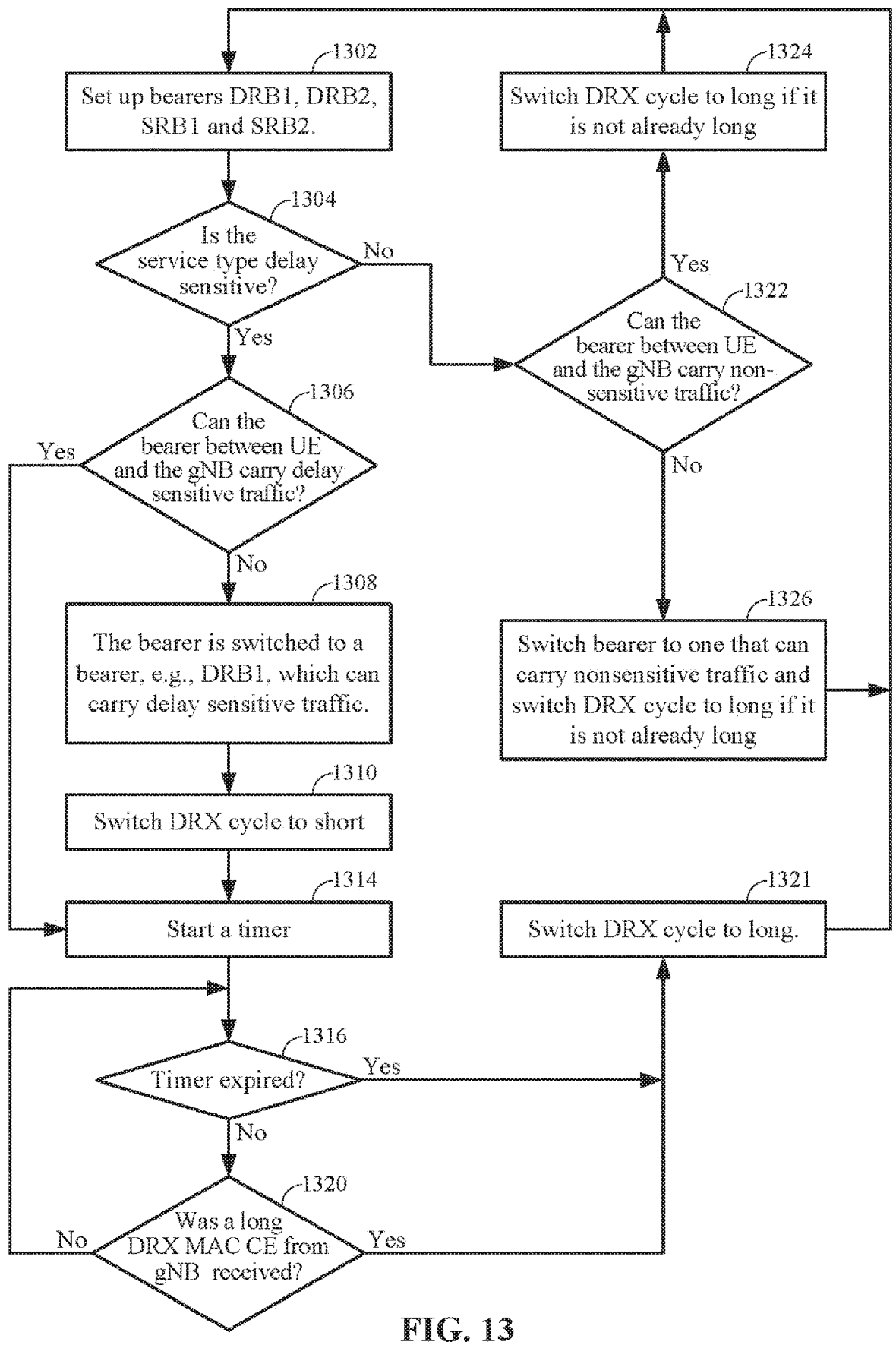
FIG. 13 is a flowchart showing the steps taken when transmitting traffic carried by different radio bearers RB(i) found in a set, S, of radio bearers in accordance with aspects of the present disclosure.

FIG. 13, shows a process for setting up a configuration of different radio bearers RB(i) found in a set, S, of radio bearers. In step 1302, the gNB 110 sets up the bearers. In step 1304, it is determined if the service type of data is delay sensitive. If the service type is delay sensitive, in step 1306, it is determined if the bearer can carry delay sensitive traffic. If the service type is delay sensitive, and it is determined the bearer cannot carry delay sensitive traffic in step 1306, then in step 1308 the bearer is switched to a bearer which can carry delay sensitive traffic. In step 1310, the DRX cycle is switched to short. At 1314, a "drxShortCycleTimer"may be started. In step 1316, the timer is checked to see if it has expired. If the the timer has expired, in step 1321, the DRX is switched to long. If the timer did not expire in step 1316, the process moves to step 1320. In step 1320, if the UE 120 receives a Long DRX MAC CE from the gNB 110, the DRX cycle is switched to a long DRX in step 1321. In step 1320, if the UE 120 did not receive a Long DRX MAC CE from the gNB 110, the process returns to step 1316. If in step 1304, the service type is not delay sensitive, then in step 1322, it is determined if the bearer between the UE 120 and the gNB 110 can carry non-sensitive traffic. If the bearer can carry non-sensitive traffic, then in step 1324, DRX cycle is switched to long when short DRX cycle timer expires if it is not already long. If the the bearer cannot carry non-sensitive traffic, then the gNB 110 in step 1326, uses a bearer that can carry non-sensitive data and the DRX cycle is switched to long when short DRX cycle timer expires if it is not already long. If it is determined the bearer can carry delay sensitive traffic in step 1306, the drxShortCycleTimer is started at step 1314.

Although two examples of DRX cycle have been used in the examples discussed above, the number of different DRX cycles is not limited to just a short or a long cycle, but may also be one of N DRX cycles whose wake-up time is located between that used for short DRX cycle and that used for long DRX cycle, where N may be determined by the network or base station.

The present method and apparatus for switching between DRX cycles based on service type may be used with mobile broadband applications and ultra-reliable low latency communications (URLLC).

Figure 14:
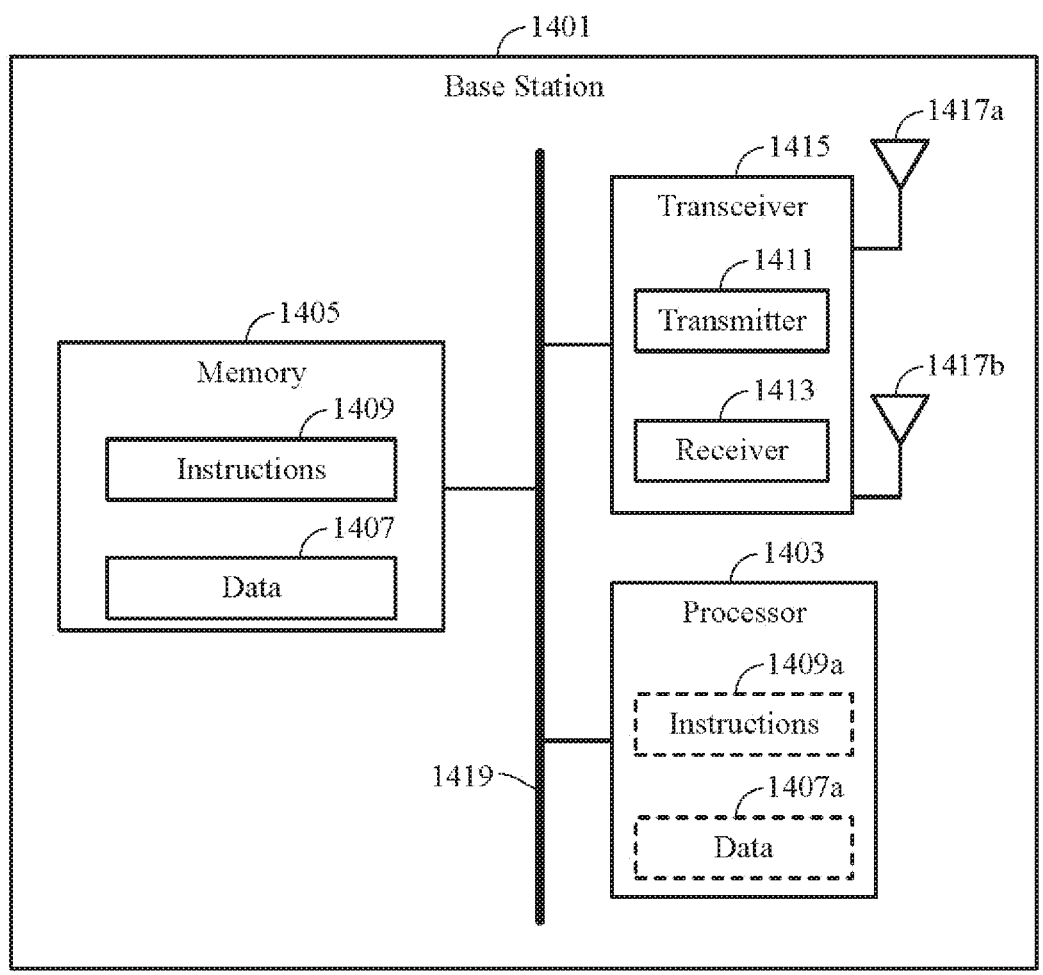
FIG. 14 illustrates certain components that may be included within a BS.

FIG. 14 illustrates certain components that may be included within a base station 1401. The base station 1401 may be an access point, a NodeB, an evolved NodeB, eNB, 5G NB, AP, NR BS, NR BS, gNB, or TRP etc. The base station 1401 includes a processor 1403. The processor 1403 may be a general purpose single- or multi-chip microprocessor (e.g., an ARM), a special purpose microprocessor (e.g., a digital signal processor (DSP)), a microcontroller, a programmable gate array, etc. The processor 1403 may be referred to as a central processing unit (CPU). Although just a single processor 1403 is shown in the base station 1401 of FIG. 14, in an alternative configuration, a combination of processors (e.g., an ARM and DSP) could be used.

The base station 1401 also includes memory 1405. The memory 1405 may be any electronic component capable of storing electronic information. The memory 1405 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1407 and instructions 1409 may be stored in the memory 1405. The instructions 1409 may be executable by the processor 1403 to implement the methods disclosed herein. Executing the instructions 1409 may involve the use of the data 1407 that is stored in the memory 1405. When the processor 1403 executes the instructions 1409, various portions of the instructions 1409a may be loaded onto the processor 1403, and various pieces of data 1407a may be loaded onto the processor 1403.

The base station 1401 may also include a transmitter 1411 and a receiver 1413 to allow transmission and reception of signals to and from the wireless device 1501. The transmitter 1411 and receiver 1413 may be collectively referred to as a transceiver 1415. Multiple antennas 1417a-b may be electrically coupled to the transceiver 1415. The base station 1401 may also include (not shown) multiple transmitters, multiple receivers and/or multiple transceivers.

The various components of the base station 1401 may be coupled together by one or more buses, which may include a power bus, a control signal bus, a status signal bus, a data bus, etc. For the sake of clarity, the various buses are illustrated in FIG. 14 as a bus system 1419.

Figure 15:
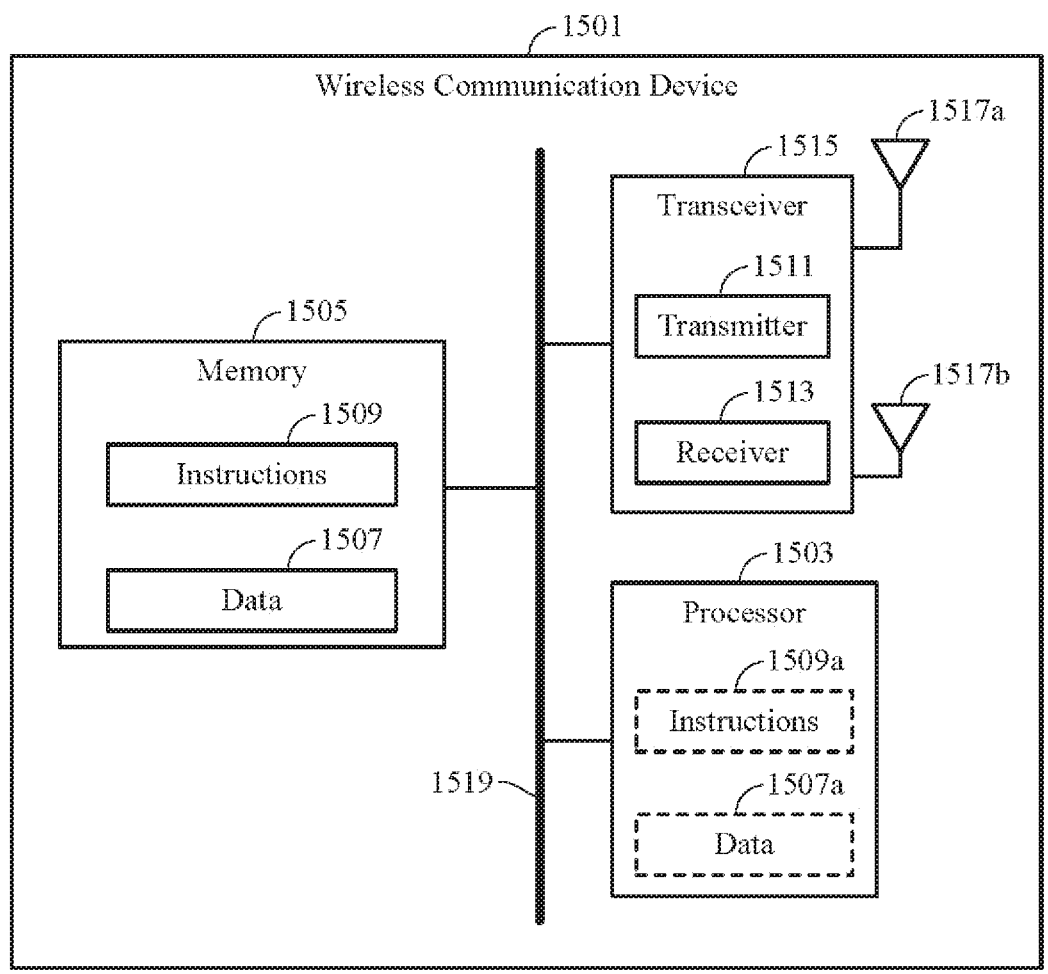
FIG. 15 illustrates certain components that may be included within a wireless communication device.

FIG. 15 illustrates certain components that may be included within a wireless communication device 1501. The wireless communication device 1501 may be an access terminal, a mobile station, a user equipment (UE), etc. The wireless communication device 1501 includes a processor 1503. The processor 1503 may be a general purpose single- or multi-chip microprocessor (e.g., an ARM), a special purpose microprocessor (e.g., a digital signal processor (DSP)), a microcontroller, a programmable gate array, etc. The processor 1503 may be referred to as a central processing unit (CPU). Although just a single processor 1503 is shown in the wireless communication device 1501 of FIG. 15, in an alternative configuration, a combination of processors (e.g., an ARM and DSP) could be used.

The wireless communication device 1501 also includes memory 1505. The memory 1505 may be any electronic component capable of storing electronic information. The memory 1505 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof Data 1507 and instructions 1509 may be stored in the memory 1505. The instructions 1509 may be executable by the processor 1503 to implement the methods disclosed herein. Executing the instructions 1509 may involve the use of the data 1507 that is stored in the memory 1505. When the processor 1503 executes the instructions 1509, various portions of the instructions 1509a may be loaded onto the processor 1503, and various pieces of data 1507a may be loaded onto the processor 1503.

The wireless communication device 1501 may also include a transmitter 1511 and a receiver 1513 to allow transmission and reception of signals to and from the wireless communication device 1501. The transmitter 1511 and receiver 1513 may be collectively referred to as a transceiver 1515. Multiple antennas 1517a-b may be electrically coupled to the transceiver 1515. The wireless communication device 1501 may also include (not shown) multiple transmitters, multiple receivers and/or multiple transceivers.

The various components of the wireless communication device 1501 may be coupled together by one or more buses, which may include a power bus, a control signal bus, a status signal bus, a data bus, etc. For the sake of clarity, the various buses are illustrated in FIG. 15 as a bus system 1519. It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for receiving on transmit and transmitting on receive.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for receiving on transmit and transmitting on receive. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication at a user equipment (UE), comprising:
   receiving downlink data or transmitting uplink data associated with a service type;
   determining whether to transition between short and long discontinuous reception (DRX) cycles based at least in part on the service type;
   transitioning between the short and long DRX cycles based at least in part on the determination; and
   transitioning from a short DRX cycle to a long DRX cycle responsive to expiration of a DRX short cycle timer, the DRX short cycle timer maintaining a count of a plurality of short DRX cycles without receiving the downlink data or transmitting the uplink data,
   wherein the service type includes signaling type, bandwidth, and operator policies regarding which applications and services are allowed to be moved from long DRX to short DRX and from short DRX to long DRX.

2. The method of claim 1, wherein the service type is delay sensitive traffic, and wherein transitioning between the short and long DRX cycles based at least in part on the determination comprises transitioning to the short DRX cycle based on the service type being the delay sensitive traffic.

3. The method of claim 1, further comprising:
   transmitting or receiving data in a radio bearer that is part of a configuration of radio bearers which triggers transitioning from the long DRX cycle to the short DRX cycle, wherein the radio bearers are characterized by a Quality of Service (QoS) Class Index (QCI) that describes a type of service that makes use of at least one of a virtual connection including signaling, best effort, conversational voice, streaming video, or delay sensitive.

4. The method of claim 3, wherein the radio bearer from the configuration of radio bearers which triggers the UE to transition between the long and short DRX cycles comprises at least one bit which enables using the short DRX cycle.

5. The method of claim 1, wherein the transitioning between the short and long DRX cycles comprises:
   using a radio bearer which has a Quality of Service (QoS) that supports low latency service to transition to or stay at the short DRX cycle.

6. The method of claim 1, wherein the transitioning between the short and long DRX cycles comprises:
   using a Quality of Service (QoS) flow that supports low latency service to transition to or stay at the short DRX cycle.

7. The method of claim 1, wherein the service type includes the operator policies regarding which applications and services are allowed to be moved from long DRX to short DRX and from short DRX to long DRX.

8. The method of claim 1, further comprising:
   receiving non-delay sensitive data;
   transitioning from the short DRX cycle to the long DRX cycle;
   receiving delay sensitive data; and
   transitioning from the long DRX cycle to the short DRX cycle.

9. The method of claim 1, wherein the plurality of short DRX cycles comprises four short DRX cycles.

10. The method of claim 1, further comprising transmitting or receiving data in a radio bearer that is part of a configuration of radio bearers which triggers transitioning from the long DRX cycle to the short DRX cycle, wherein the radio bearer from the configuration of radio bearers which triggers the UE to transition between the long and short DRX cycles comprises at least one bit which enables using the short DRX cycle.

11. A method of wireless communication at a wireless communications device, comprising:
    configuring data in a radio bearer that is part of a configuration of radio bearers which triggers transitioning from a long discontinuous reception (DRX) cycle to a short DRX cycle, the data associated with a service type, wherein the service type includes signaling type, bandwidth, and operator policies regarding which applications and services are allowed to be moved from long DRX and short DRX and from short DRX to long DRX;
    transmitting to a user equipment (UE) the configured data in the radio bearer; and
    wherein the UE is configured to transition from the short DRX cycle to the long DRX cycle responsive to expiration of a DRX short cycle timer, the DRX short cycle timer maintaining a count of a plurality of short DRX cycles without receiving downlink data or transmitting uplink data.

12. The method of claim 11, wherein the radio bearer that is a part of the configuration of radio bearers comprises at least one bit which allows using the short DRX cycle.

13. An apparatus for wireless communication comprising:
    a memory; and
    a processor coupled to the memory, the processor configured to:
    receive downlink data or transmit uplink data associated with a service type;
    determine whether to transition between a short discontinuous reception (DRX) cycle and a long DRX cycle based at least in part on the service type;
    transition between the short DRX cycle and the long DRX cycle based at least in part on the determination; and
    transition from the short DRX cycle to the long DRX cycle responsive to expiration of a DRX short cycle timer, the DRX short cycle timer maintaining a count of a plurality of short DRX cycles without receiving the downlink data or transmitting the uplink data,
    wherein the service type includes signaling type, bandwidth, and operator policies regarding which applications and services are allowed to be moved from long DRX to short DRX and from short DRX to long DRX.

14. The apparatus of claim 13, wherein the service type is delay sensitive traffic.

15. The apparatus of claim 13, wherein the processor is further configured to transmit or receive data in a radio bearer that is part of a configuration of radio bearers which triggers transitioning from the long DRX cycle to the short DRX cycle, and wherein the radio bearers are characterized by a Quality of Service (QoS) Class Index (QCI) that describes a type of service that makes use of at least one of a virtual connection including signaling, best effort, conversational voice, streaming video, or delay sensitivity.

16. The apparatus of claim 15, wherein the radio bearer from the configuration of radio bearers which triggers the UE to transition between the short DRX cycle and the long DRX cycle comprises at least one bit which allows using a short DRX cycle.

17. The apparatus of claim 13, wherein the processor is further configured to use a radio bearer which has a Quality of Service (QoS) that supports low latency service to transition to or stay at the short DRX cycle.

18. The apparatus of claim 13, wherein the processor is further configured to use a Quality of Service (QoS) flow that supports low latency service to transition to or stay at the short DRX cycle.

19. An apparatus for wireless communication comprising:
a memory; and
a processor coupled to the memory, the processor configured to:
configure data in a radio bearer that is part of a configuration of radio bearers which triggers transitioning from a long discontinuous reception (DRX) cycle to a short DRX cycle, the data associated with a service type, wherein the service type includes signaling type, bandwidth, and operator policies regarding which applications and services are allowed to be moved from long DRX and short DRX and from short DRX to long DRX;
transmit to a user equipment (UE) the configured data in said radio bearer; and
wherein the UE is configured to transition from the short DRX cycle to the long DRX cycle responsive to expiration of a DRX short cycle timer, the DRX short cycle timer maintaining a count of a plurality of short DRX cycles without receiving downlink data or transmitting uplink data.

20. The apparatus of claim 19, wherein the radio bearer that is a part of the configuration of radio bearers comprises at least one bit which allows using the short DRX cycle.

* * * * *